United States Patent [19]

Casey et al.

[11] Patent Number: 4,855,936
[45] Date of Patent: Aug. 8, 1989

[54] FULL-SCREEN INPUT/OUTPUT APPLICATION PROGRAM INTERFACE

[75] Inventors: Christine T. Casey, Newark Valley, N.Y.; Stephen E. Record, Ridgefield, Conn.

[73] Assignee: International Business Machines Corp., Armonk, N.Y.

[21] Appl. No.: 101,537

[22] Filed: Sep. 25, 1987

[51] Int. Cl.$^4$ .............................................. G06F 3/14
[52] U.S. Cl. ..................................... 364/521; 364/900
[58] Field of Search ....................... 364/200, 900, 521; 358/280; 340/789

[56] References Cited

U.S. PATENT DOCUMENTS

| | | | |
|---|---|---|---|
| 4,486,828 | 12/1984 | Kitamura et al. | 364/200 |
| 4,509,122 | 4/1985 | Agnew et al. | 364/200 |
| 4,646,235 | 2/1987 | Hirosawa et al. | 364/200 |
| 4,679,074 | 7/1987 | Sugiura et al. | 358/280 X |

OTHER PUBLICATIONS

"IBM System/370-Extended Architecture Principles of Operation", SA22-7085, Mar. 1983.
"IBM System/370 Principles of Operation," GA2-2-7000, Aug. 1976 as amended by IBM Technical Newsletter No. GN22-0683, Jun. 12, 1985.
"Virtual Machine/System Product CMS Console Facility, Release 4", SC24-5333—0, Jul. 1986.
"VM/SP System Facilities for Programming, Release 5", SC24-5288-0, Dec. 1986.

*Primary Examiner*—David L. Clark
*Attorney, Agent, or Firm*—Whitham and Marhoefer

[57] ABSTRACT

An application program interface for handling full-screen input/output (I/O) operations of a display device an in information handling system, such as a computer system running one or more application programs in conjunction with an operating system. The application program interface first determines characteristics of the display device in response to a request from an application program prior to performing a full-screen I/O operation, and provides these characteristics to the application program so that the application program can provide a buffer, and if an output is to be performed, construct a valid data stream for the display device. Then the application program interface builds a parameter list in response to a request from an application program to actually perform the full-screen I/O operation. Next, in response to the parameter list, the application program interface generates instructions to process the full-screen I/O operation and coordinate this request with other requests made by other application programs. The application program interface then passes the generated instructions to a control program of the information handling system to perform the desired full-screen I/O operation, and handles any status information resulting from the I/O operation. In this manner, the application program interface provides a means for allowing an application programmer to write an application program without being concerned with low level detail of a full-screen I/O operation, as well as providing a means for coordinating full-screen I/O use of a display device by several application programs in an information handling system, and a means for allowing an application program to be architecture independent with respect to full-screen I/O operation.

6 Claims, 4 Drawing Sheets (FIG. 3)

FORMAT-0 CHANNEL COMMAND WORK (CCW)

FORMAT-1 CHANNEL COMMAND WORD (CCW)

SYSTEM/370 CHANNEL STATUS WORK (CSW)

SYSTEM/370-EXTENDED ARCHITECTURE SUBCHANNEL STATUS WORD (SCSW)

FULL-SCREEN INPUT/OUTPUT APPLICATION PROGRAM INTERFACE

BACKGROUND OF THE INVENTION

The present invention generally relates to input/output (I/O) operations in information handling systems, and, more particularly, to full-screen input/output (I/O) operation of a display device in an information handling system, such as a computer system running one or more application programs (software) in conjunction with an operating system (software).

Typically, an information handling system, such as a computer system, includes a central processing unit (CPU) controlled by an operating system (software), and has one or more application programs (software) that perform I/O operations using a display device, such as a terminal with an attached keyboard, through which a user of the computer system can input information (data) to, and receive information (data) from, the computer system. The operating system normally includes a control program (CP) capable of controlling I/O operation of the display device by causing control signals to be provided to the display device as required during normal operation of the computer system. Also, the application program(s) may control I/O operation of the display device by including in their program code appropriate instructions for causing these same kinds of CP control signals to be provided to the display device. However, this requires application programmers to be familiar with relatively low level CP programming techniques and instructions, and presents programming compatibility problems when it is desired to transfer an application program from one computer system to another computer system having a different operating system. Primarily because of the foregoing, application programs have not taken full advantage of the full-screen I/O capabilities of display devices, or have often limited their I/O operation of display devices to line-oriented input and output.

For example, prior to introduction by International Business Machines (IBM) Corporation of the present invention as part of the Conversational Monitor System (CMS) in the IBM Program Product operating system named Virtual Machine/System Product (VM/SP) (IBM Program Product Number 5664-167), support for display devices was limited to line-oriented input and output. In fact, CMS itself did not even make full-screen use of its virtual console (a virtual console is a console simulated by CP on a terminal) except in the System Product Editor (XEDIT), which, though part of CMS, is really an application program that resides in the CMS nucleus for performance reasons. Any other CMS application program which required full use of a display screen had to avail itself, as XEDIT did, of the full-screen console support provided by the VM/SP control program (CP), embodied in a Diagnose X'58' instruction which is a low-level CP instruction to a virtual console, and which is described in more detail in an IBM publication entitled "VM/SP System Facilities for Programming, Release 5" (SC24-5288-0), the entire disclosure of which is incorporated herein by reference. The interface presented by the Diagnose X'58' instruction is equivalent to that of the System/370 Start I/O (SIO) instruction, which is a System/370 assembler programming language instruction, and which is described in more detail in an IBM publication entitled "IBM System/370 Principles of Operation" (GA22-7000), the entire disclosure of which is incorporated herein by reference. Any computer program issuing the Diagnose X'58' instruction must construct channel programs defining the I/O operations to be performed, field I/O interrupts generated either by execution of the channel programs or by user activity at the keyboard, and recover from any errors that may result. Doing this correctly involves delicate and complicated programming, and, if the programming is not done carefully, can result in faulty program code in CMS application programs which do full-screen I/O to a display device.

Although CMS has long had an application interface for fielding I/O interrupts (a macro named HNDINT), it is somewhat difficult, and not particularly practical, for full-screen programs to use HNDINT in managing the virtual console because of the need to share the virtual console with the native CMS line-oriented support. Since the issuer of HNDINT is expected to take complete responsibility for the device being managed, a program using HNDINT for the virtual console has to duplicate all of CMS line-oriented console support as well as implement its own full-screen operations, which can be burdensome. As a result, full-screen CMS programs have been obliged to subvert the defined CMS interface for managing virtual devices. This has commonly been done by altering the instruction address in the I/O new PSW (program status word), so that receipt of an I/O interrupt causes control to transfer into the application program rather than into the CMS nucleus. It then devolves upon the application to pass any interrupts which it cannot handle (for example, for devices other than the console) on to the standard CMS I/O interrupt handler. This additional complexity can lead to additional faulty application program code, particularly when one full-screen program may invoke another, unless the programmer is very careful when writing the application program code.

Even a computer program which does low-level console I/O (as described above) correctly is faced with additional complications if it is required to execute in both System/370 and System/370-Extended Architecture (XA) virtual machines, or on both virtual consoles and dedicated display devices. To exploit the larger address spaces available in System/370-XA, computer programs must be capable of handling 31-bit storage addresses. However, the channel programs used by Diagnose X'58' cannot address storage above 16 megabytes without the use of Indirect Data Address Lists (IDAL's). Also, the I/O instructions that must be used in addition to Diagnose X'58' are completely different in System/370 and System/370-XA, so that a program which has to execute in either environment is obliged to include separate execution paths for each. Similarly, the System/370-XA PSW format is different from that traditionally used by CMS in System/370 mode, leading to additional complexity in stealing the I/O new PSW when both modes must be supported. Furthermore, the Diagnose X'58' interface is only valid for the virtual console. I/O to a dedicated display device must be performed with the System/370 SIO or System/370-XA Start Subchannel (SSCH) instruction, and somewhat different channel programs must be built.

As is apparent from the foregoing, there is a need to provide solutions to the full-screen I/O problems discussed above. For example, there is a need to free application programs from building channel programs, handling I/O interrupts, or worrying about the details of error recovery. In addition, it is desirable in an operating system environment, such as a VM/SP environment, to eliminate the need to subvert CMS I/O interrupt handling by stealing the I/O new PSW. Also, there is a need for defining an interface that is independent of virtual machine architecture and virtual device implementation and which performs equivalently in System/370 or System/370-XA machines and on virtual consoles or dedicated displays. Further, there is a need to provide additional function for coordinating use of a display screen by multiple application programs, as well as coordinating full-screen I/O within an operating system.

SUMMARY OF THE INVENTION

Therefore, an object of the present invention is to provide a method and means for allowing an application programmer to write an application program without the need to be concerned with low level detail of a full-screen I/O operation.

Another object of the present invention is to provide a method and means for coordinating full-screen I/O use of a display device by several application programs in an information handling system.

A further object of the present invention is to provide a method and means for allowing an application program to be architecture independent with respect to full-screen I/O operation.

These and other objects of the present invention are attained by providing, in an information handling system having a central processing unit controlled by an operating system and having one or more application programs that perform I/O operations to a display device, an application program interface (computer program) which, in its basic form, determines characteristics of a display device in response to a request from an application program prior to performing a full-screen input/output operation and provides these characteristics to the application program so that the application program can provide a buffer and, if an output operation is to be performed, construct a valid data stream for the device; builds a parameter list in response to a request from the application program to perform the full screen input/output operation using the buffer and any data stream provided by the application program; responds to the parameter list by generating instructions to process the request and coordinates this request with other requests that may be made by the application programs; passes the generated instructions to the control program to perform the desired full screen input/output operation; and handles status information resulting from the input/output operation.

BRIEF DESCRIPTION OF THE DRAWING

Other objects and advantages of the present invention will be apparent from the following description in conjunction with the accompanying drawings, which are given by way of illustration only and are not intended to be limiting of the present invention, and in which.

DESCRIPTION OF THE PREFERRED EMBODIMENT

Figure 1:
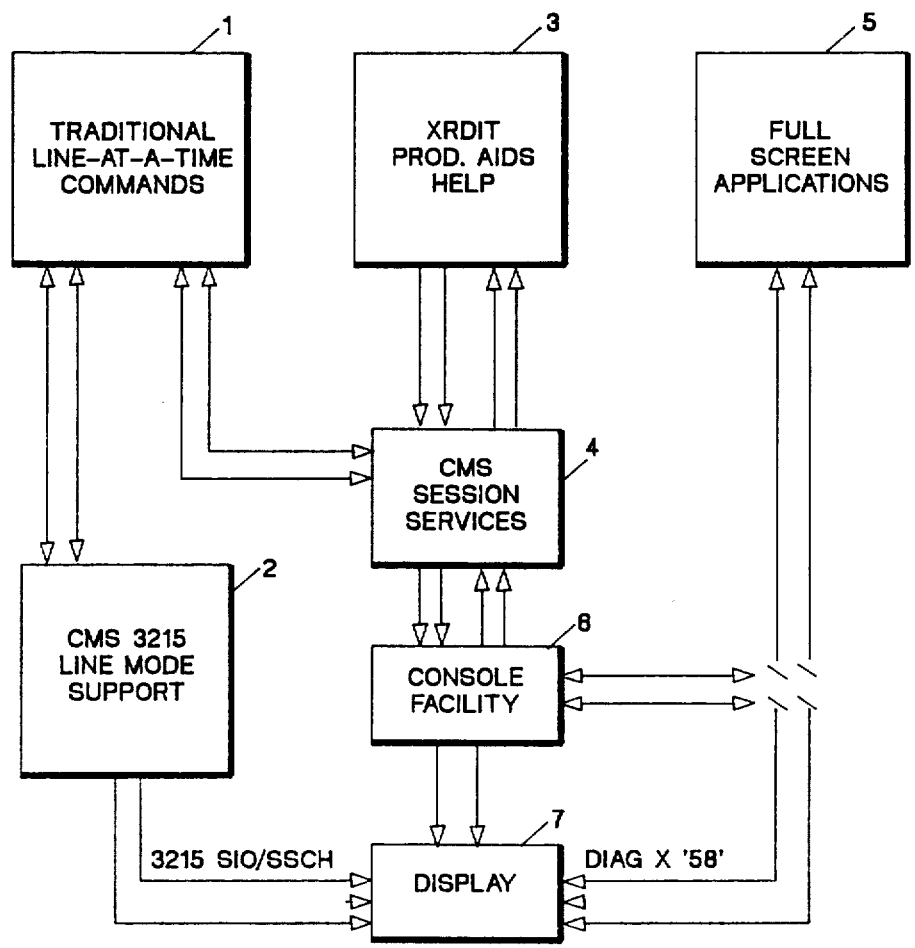
FIG. 1 is a block diagram illustrating the application program interface according to the present invention as embodied in the overall structure of the IBM Virtual Machine/System Product (VM/SP) Conversational Monitor System (CMS) I/O handling routines.

Referring to FIG. 1, a block diagram is shown illustrating the application program interface (API) according to the present invention as it is embodied in the IBM "CMS Console I/O Facility" (hereinafter called Console Facility 6) which is part of the current IBM VM/SP operating system, and which was designed to fit into the overall structure of the IBM Virtual Machine/System Product (VM/SP) Conversational Monitor System (CMS) I/O handling routines, at a VM/SP Release 5 level or later release of VM/SP. The IBM "CMS Console I/O Facility" is described in an IBM publication entitled "Virtual Machine/System Product CMS Console Facility, Release 4" (SC24-5333-0), the entire disclosure of which is incorporated herein by reference.

Blocks 1 and 2 in FIG. 1 depict the CMS system in a non-full-screen environment, sometimes referred to as a line mode environment, which does not involve the API according to the present invention. The commands at this level are handled by a line mode (3215) start I/O (SIO) instruction in a System/370 mode machine, or a start subchannel (SSCH) instruction in an System/370-XA mode machine, and CMS has to be sensitive to the machine architecture to handle all its own I/O to and from a display device 7.

The System Product Editor (XEDIT) 3 is an application program that resides in the CMS nucleus, and which can take advantage of the I/O processing provided by the Console Facility 6. The system HELP routines and productivity aids such as "RDRLIST" and "FILELIST" programs in CMS also display full-screens of data in this manner using XEDIT 3. As described above in the "Background Of The Invention" section, XEDIT previously performed all of its own input/output operations, and handled the architecture-dependent processing involved with those operations. As of VM/SP Release 5, the building of a 3270 data stream is done in CMS Session Services 4, which sets up calls to the Console Facility 6 for particular requests. The data stream consists of orders (instructions that provide control information) and data to be written to a 3270-type display device, based on the size, attributes, and other characteristics of the device.

Likewise, before the advent of the Console Facility 6, other full-screen applications (application programs) 5 had to perform their own low-level I/O instructions, build the channel program, and handle interrupts and any errors received from the display device 7. Applications may still use this method but will have to be sensitive to whether the device is a virtual console or dedicated device, and whether the architecture of the machine is System/370 or System/370-XA. However, if the application programs 5 use the higher-level API of the Console Facility 6, they will be able to easily migrate from System/370 to System/370-XA and let the Console Facility 6 handle the processing of input/output operations.

Still referring to FIG. 1, it should be noted that the Console Facility 6 comprises a macro interface and one or more modules which allow an application program to request the following functions, which will be detailed further below in reference to FIGS. 2 and 3:

OPEN - Sets up an application "path" to a display device specified by the application program, such as display device 7. The path name uniquely identifies one application from another. The Console Facility 6 supports doing I/O to dedicated 3270 devices, including dialed devices and 3270 graphics printers, as well as to the virtual console.

CLOSE - Deletes the specified path entry.

READ/WRITE - Reads and Writes buffers containing 3270 data streams built by the application program. The Channel Command Words (CCWs) are built and a Diagnose X'58' instruction is issued for the virtual console, and SIO or SSCH is issued for dedicated devices.

EXCP - Performs I/O operations using CCWs supplied by the application program.

WAIT - Waits for an I/O interrupt on a path's corresponding display device.

QUERY - Returns display device information if a user specifies QUERY DEVICE, or returns both path and associated device information if QUERY PATH is specified.

Figure 2:
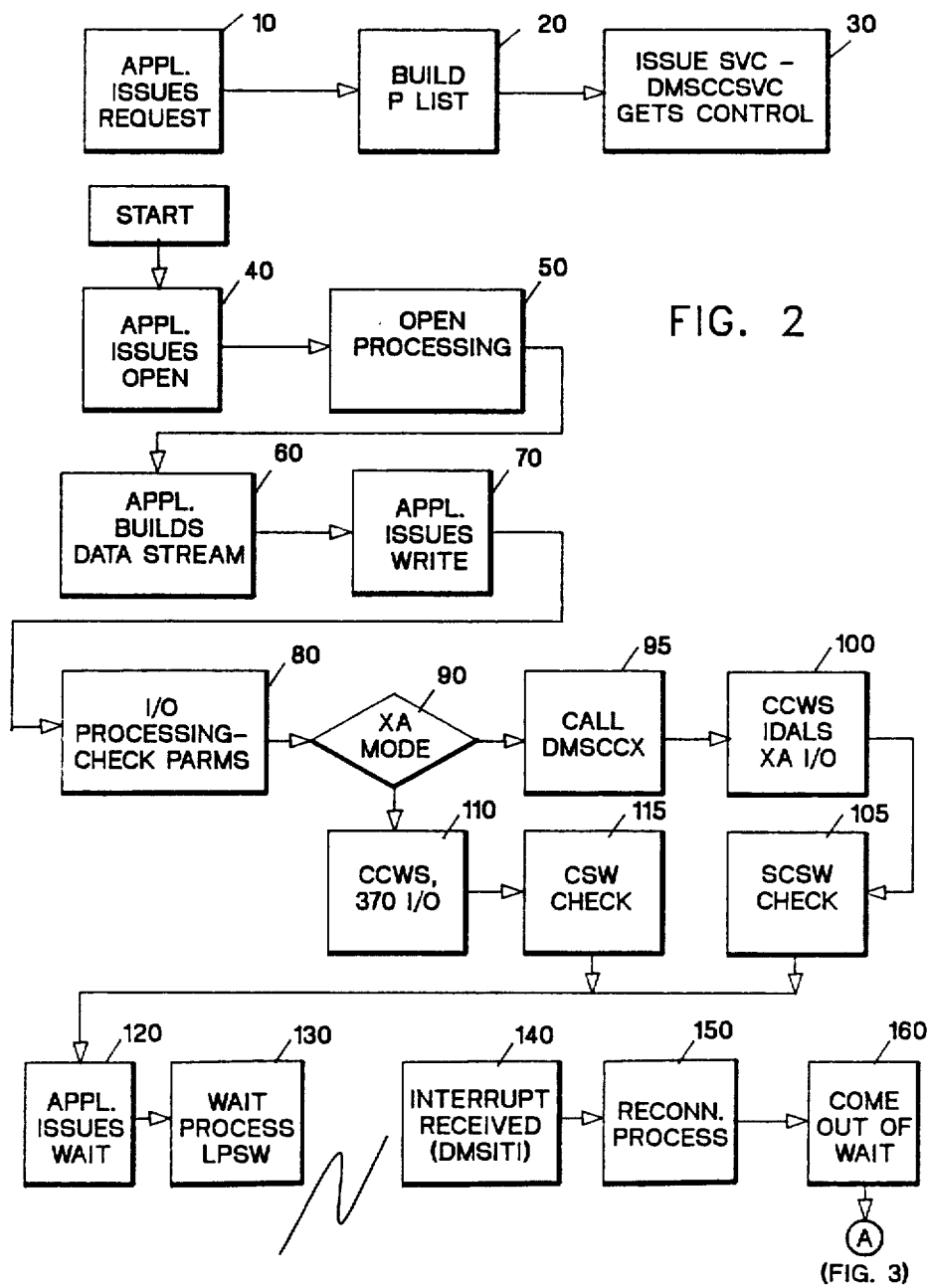
FIGS. 2 and 3 show a flow chart of the operation of the application program interface according to the present invention, and its interactions with an application program.
Figure 3:
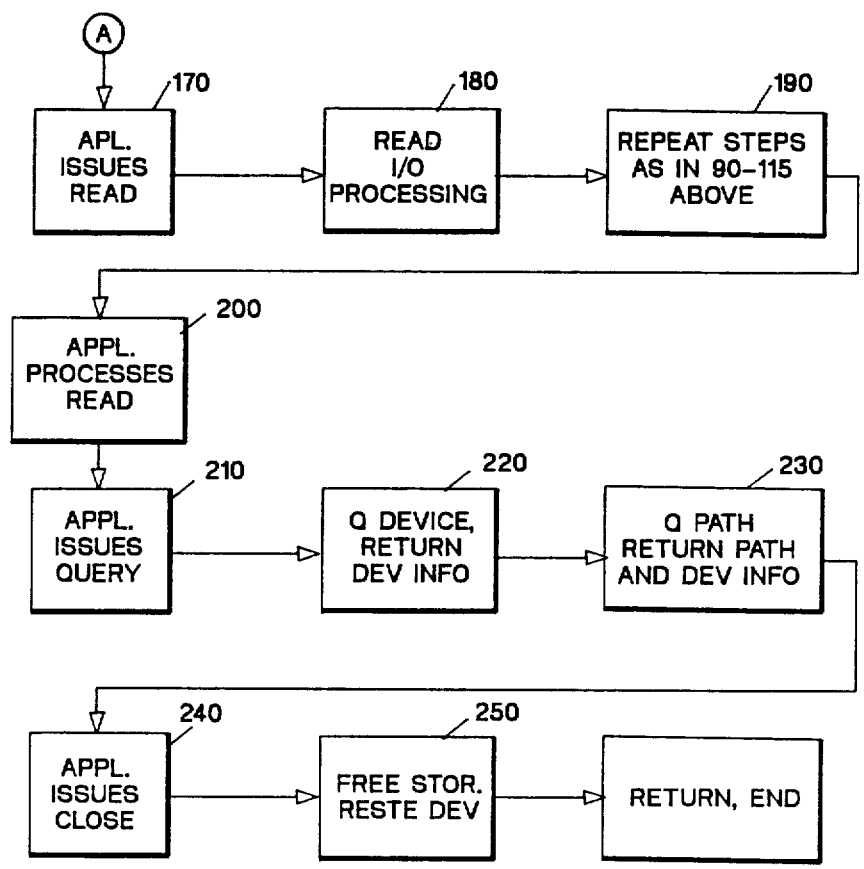

FIGS. 2 and 3 show the logic of the Console Facility 6 illustrated in FIG. 1. In operation, an application program 10 issues a request for a particular function to the macro of the Console Facility 6 (console macro) which generates instructions that build a parameter list (Plist) 20 needed for the requested function. Included in the generated instructions is a supervisor call (SVC), which passes control to a module, DMSCCSVC, that processes the request (block 30). This process takes place each time the application program 10 issues a macro call to the Console Facility 6. The scenario about to be described is one example of what steps an application program 10 may need to take to use the Console Facility 6 to effectively communicate with the display device 7. Each application program may take a somewhat different approach, some more complex than others, but for demonstration purposes the following description will provide the necessary information to understand the processing involved in the underlying functions.

Beginning with block 40, the application program 10 must first define itself to the Console Facility 6 by issuing an Open request. This establishes a communication path to the associated display device 7. In diagram block 50, if the specified path name already exists, a return code will be issued and the information about that path and display device will be returned in a buffer, if provided by the application program 10; otherwise, if the path name does not exist, processing continues to attempt to open a path. This is the only Console Facility 6 function that proceeds when a path is not found.

As stated earlier, the Console Facility 6 is a single interface to both the virtual console and dedicated 3270 devices. If the parameter list (Plist) does not have a device number specified, the virtual console is assumed. A Diagnose X'24' instruction is issued by the Console Facility 6 to get the virtual and real device characteristics of the device number in the Plist. Providing the device is defined and capable of full-screen I/O, and is not, for example, a typewriter-type terminal (TTY), a Diagnose X'8C' will also be issued by the Console Facility 6 to obtain additional device characteristics, including information about whether or not the device supports color, extended highlighting, or programmable symbol sets (PSS). Diagnose instructions are described in more detail in an IBM publication entitled "VM/SP System Facilities for Programming, Release 5" (SC24-5288-0), the entire disclosure of which is incorporated herein by reference. Once the Console Facility 6 determines the device is valid for the Open function, it will save the path and device information in control blocks maintained in a linked list, to be used for subsequent I/O operations. Each path opened has an associated device entry, and there may be more than one path opened to any given device. Some information is extracted from these path and device control blocks and stored in a buffer supplied by the application program 10. The application program 10 can then use a mapping macro (CQYSECT) provided by the Console Facility 6 to interpret the information returned.

From the information pertaining to the characteristics of the 3270 display device, the application program 10 can then proceed to construct a valid 3270 data stream for that device as shown in diagram block 60. A data stream controls the processing and formatting of the data with commands, orders (instructions that provide control information), control characters, attributes, or structured fields. On a Console Facility 6 Write request (block 70), the application must supply a buffer that contains the data stream.

In the subroutine that begins the I/O processing, DMSCCSVC checks the parameters passed in by the parameter list, and ensures that all the required parameters are specified and conflicting options are not specified (block 80). Once it is determined that there is a valid I/O request, the processing continues to build the necessary information for the I/O operation.

The Write function of the Console Facility 6 allows applications to write a full-screen of data to their display device. By keeping track of the path which did the last I/O operation, the Console Facility 6 can coordinate the use of the screen among several applications.

For the application program 10 to get into full-screen mode, the application program 10 must first issue an Erase/Write (EW) or Erase/Write Alternate (EWA) command to cause a complete erasure of the contents of the screen and then write its buffer. This is also true if the Console Facility 6 tells the application program 10, via a return code, that another application program has control of the screen, and an EW/EWA must be issued to reformat the screen and give the application program 10 control. Once the application program 10 owns the screen, it may do subsequent writes with an ordinary Write (W) command, which simply updates the contents of the current screen. If the application program 10 specifies the Erase/Write, Erase/Write Alternate, Write Structured Field, or Write options, it must provide a buffer that contains a complete 3270 data stream as described above. The Console Facility 6 does not modify this buffer in any way, nor does it verify its contents. Therefore, the application program 10 must be sure the macro options are consistent with what is provided in the data stream. Block 90 shows DMSCCSVC checking the virtual machine architecture that the application is running on (370 or XA mode). This is the point where much of the architecture-dependent information is built, and the Console Facility 6 must determine if control should be passed to another module, DMSCCX, to handle System/370-XA I/O processing (block 95), or to proceed within DMSCCSVC to build the appropriate Channel Command Word (CCW) based on the macro options specified (block 110). For the virtual console, CCWs are built for a Diagnose X'58' instruction; for dedicated devices CCWs are built for SIO instructions according to System/370 Architecture. Block 100 involves a very similar process in XA mode, however the CCWs must be built in accordance with the System/370-Extended Architecture. For dedicated devices the CCWs are built for a SSCH instruction, which involves a different format (format-1) and additional information contained in an Operation Request Block (ORB). A Diagnose X'58' instruction must be used for I/O to a virtual console in both 370 and XA modes of operation, but it only accepts a format-0 CCW that can only have a 3-byte data address. To accommodate a 31-bit address in the channel program the Console Facility 6 sets up an Indirect Data Address List (IDAL) which can then address storage above 16 megabytes.

Figure 4:
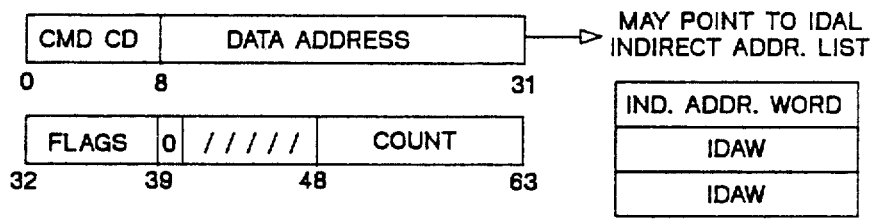
FIG. 4 is a diagram of two different formats for a System/370 Architecture and System/370-Extended Architecture (XA) channel command word (CCW), and formats of a System/370-mode channel status word (CSW) and System/XA-mode subchannel status word (SCSW). This diagram is supplied for reference purposes relative to the following detailed description of the preferred embodiment of the present invention.
Figure 4:
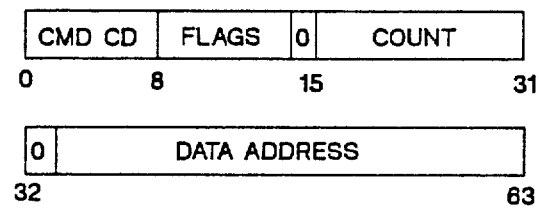
Figure 4:
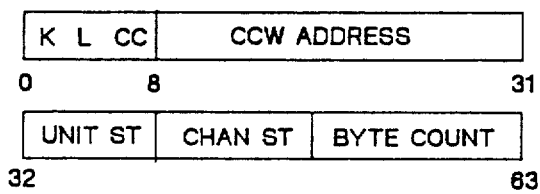
Figure 4:
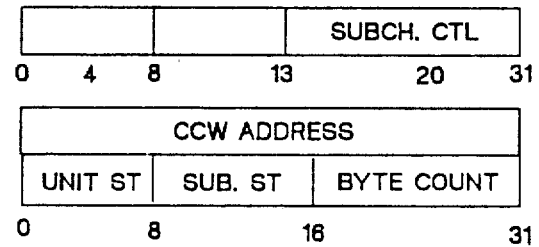

FIG. 4 shows a format-0 CCW used in System/370 architecture or for Diagnose X'58' instructions in both System/370 and System/370-XA architectures, and a format-1 CCW used in System/370-XA. The address portion of the format-0 CCW may point to data or an IDAL. Each four-byte entry, or Indirect Data Address Word (IDAW) in the IDAL will point to the data to be written or read. IDALs allow programs to address buffers in storage located above 16 megabytes for a Diagnose X'58' channel program in XA mode. There is a bit in the CCW that lets the control program know whether or not the CCW data address actually points to a data buffer or to an IDAL. FIG. 4 also shows the formats of a System/370 Channel Status Word (CSW) and a System/370-XA Subchannel Status Word (SCSW) to give the contrast of the two architectures in dealing with the building blocks of I/O operations. For more detailed information about the foregoing, see the IBM publication entitled "IBM System/370 Principles of Operation" (GA22-7000), and the IBM publication entitled "IBM System/370-Extended Architecture Principles of Operation" (SA22-7085), the entire disclosures of which are incorporated herein by reference.

The Console Facility 6 performs its I/O operations synchronously; that is, the Console Facility 6 waits for completion of the I/O operation by issuing Test I/O (TIO) instructions in 370 mode, or Test Subchannel (TSCH) instructions in XA mode. The checking of the Channel Status Word (CSW) in 370 mode (block 115), or the Subchannel Status Word (SCSW) in XA mode (block 105) and retrying I/O for some error conditions is the responsibility of the Console Facility 6. For an immediate error from the execution of an I/O instruction, the Console Facility 6 attempts to find out more information about why the operation failed. This is done by issuing another Diagnose X'24' instruction to obtain device characteristics, which can tell the application program 10 if the error occurred because the device is currently disconnected, detached, or if the characteristics changed because a disconnect and reconnect to a different device occurred since the last I/O for that path. The result of this determination is communicated to the application program 10 in summary form as a characteristic return code. If further information is needed, the application program 10 may issue a Query Path request to receive the CSW/SCSW contents and any sense data obtained after the last I/O operation.

Once the screen is successfully written, the application program 10 issues a Wait request (block 120). When an application program wants to wait for an interrupt on a device associated with its path, it issues a Wait request, or a Read with a Wait option request. The wait routine keeps track of the path which is waiting and then loads an enabled wait PSW (block 130). When the interrupt comes in through the first-level interrupt handler, DMSITI, control will return to the Console Facility 6 wait routine after the load PSW instruction (LPSW). Then control will return to either the application program that issued a wait request, or to the Console Facility 6 routine that issues a read operation to handle the interrupt. If the application program issued an explicit wait request, then it must handle the interrupt by issuing a read request when control returns to it.

To accommodate the foregoing processing, DMSITI (block 140) must pass the interrupts back to the Console Facility module, DMSCCSVC, (block 160). The Console Facility 6 device entries are searched for a device address that matches the interrupting device address. If found and a path is waiting for that interrupt, the CSW/SCSW is moved to the path entry and control is returned to the Console Facility 6. If the device entry indicated the device was disconnected, then this is assumed to be a reconnect and an entry point is called to update the device information in the Console Facility 6 device entry (block 150). This helps keep the device information current. If no path is waiting on the interrupting device, then processing continues in DMSITI to search user-defined tables (routines established by HNDINT), check for STAX exits (exits for attention interrupts only), and check for Console Facility exits (defined by the Open function). If none of the foregoing has been previously defined by any application program, then control is given to a CMS I/O routine.

The concept of a Console Facility 6 path exit is designed primarily for dedicated devices, but exits may also be used for the virtual console. When several paths are opened to the same device, it is the exit routine of the path which did I/O last that is driven. If no path did I/O, then the exit of the last opened path will get control. If the path that performed the last I/O, or the last opened path, no longer exists (has been closed), then processing continues as if no exits were specified, and DMSITI will give control to a CMS I/O routine.

When the application program 10 regains control after a Wait, it will issue a Read request (block 170). The read function allows the application program 10 to read the contents of the physical screen into the buffer that it provides. This can be either the entire screen or just the modified fields on the screen. Alternatively, the application program 10 may choose to use the Console Facility 6 read function with the wait option. The latter will tell the Console Facility 6 to first wait for the interrupt, then perform the read, thus saving the user an additional call to DMSCCSVC.

Read CCWs are built in the same manner as for the write function by checking the options contained in the parameter list (block 20) and building channel programs for either Diagnose X'58' or System/370 I/O instructions (block 180). Like writing, DMSCCX will be called to handle the reading for System/370-XA (block 190). READ and WRITE share the same subroutines for performing the I/O and checking the Channel Status Word or Subchannel Status Word.

Block 200 shows control returned to the application program 10 where that program must process the information just read into its buffer. Most application programs will need to determine what key on the terminal was pressed and if there are any modified fields on the screen that need to be displayed (i.e. the user typed something in and hit enter). Generally, the application program 10 will then go back and rewrite the screen, with any new information. The processing between blocks 60 and 200 will usually be in some type of loop, with a series of writes, waits, and reads.

In addition to the read and write functions that the Console Facility 6 provides, there is an execute channel program (EXCP) function, provided by the Console Facility 6, that allows an application program to provide its own CCWs or channel program. The Console Facility 6 does not validate the CCWs, nor convert them to a form appropriate to the implementation. The I/O operation and CSW/SCSW checking is handled in the same manner as with read and write functions, but with using CCWs provided by the application program.

Block 210 shows the application program 10 issuing a Query request. This query function returns information about a specific path and/or device in a buffer provided by the application program. A request to query a device will return just device information (block 220); the device need not have a path opened to it. A request to query a path will return path information as well as information about its associated device (block 230). A query request may be useful after an I/O error has occurred so an application program can further examine the CSW/SCSW or any sense data from the I/O operation. The information returned for a query request is taken from the existing path and/or device entries in storage, unless the device is one that the Console Facility 6 does not have any paths opened to. In that case, the device characteristics are obtained from Diagnose X'24' and X'8C' instructions and stored in the application program's buffer.

Before exiting a full-screen application, it is a good programming practice to issue a Close request (block 240). Block 250 shows that this function releases the storage occupied by the path entry that is no longer needed. When the last path to a device is closed the device entry is also freed and a CP RESET command is issued if the device was dedicated. This will clear any pending interrupts from the device and will drop a dialed connection for dialed devices.

Of course, the foregoing description is directed to one particular embodiment of the present invention and various modifications and other embodiments of the present invention will be apparent to one of ordinary skill in the art to which the present invention pertains. Therefore, while the present invention has been described in conjunction with a particular embodiment it is to be understood that various modifications and other embodiments of the present invention may be made without departing from the scope of the present invention as described herein and as claimed in the appended claims.

What is claimed is:

1. A method of providing full-screen input/output operations in an information handling system having a central processing unit controlled by an operating system and having one or more application programs that perform input/output operations to a display device, said method being performed by a console facility communicating between said operating system and said one or more application programs, comprising the steps of:

determining characteristics of the display device in response to an inquiry for said characteristics from an application program and providing these characteristics to the application program
   for use in providing a buffer and, if an output operation is to be performed,
   construction a data stream for the device;
   in response to a request from an application program to perform
   a full screen input/output operation using the buffer and any data stream provided by the application program, building a parameter list; generating instructions to process the request
   ; passing the generated instructions to the
   operating system to perform the desired full screen input/output operation; and
   passing status information resulting from the input/output operation to the application program.

2. The method of providing full screen input/output operations as recited in claim 1 further comprising the step of: determining characteristics of the central processing unit for use in generating instructions to perform full screen input/output operations which are suitable for the central processing unit.

3. The method of providing full screen input/output operations as recited in claim 2 wherein said step of determining characteristics of the central processing unit is performed by issuing a request for said characteristics to the operating system.

4. The method of providing full screen input/output operations as recited in claim 1 further comprising the step of:

determining characteristics of the operating system for use in generating instructions to perform full screen input/output operations which are suitable for the operating system.

5. The method of providing full screen input/output operations as recited in claim 4 wherein the step of determining characteristics of the operating system is performed by issuing a request for certain characteristics of the central processing unit to the operating system and inferring characteristics of the operating system from said characteristics of the central processing unit.

6. The method of providing full screen input/output operations as recited in claim 1 further comprising the step of: coordinating the request with other requests made by other application programs by retaining information as to which of said one or more application programs last performed an input/output operation to the display device and generating instructions to erase and reformat the display device as needed.

* * * * *